United States Patent [19]

Takimoto et al.

[11] Patent Number: 5,127,947
[45] Date of Patent: Jul. 7, 1992

[54] RECORDING LIQUID AND INK-JET RECORDING METHOD

[75] Inventors: Hiroshi Takimoto; Hideo Sano, both of Kanagawa, Japan

[73] Assignee: Mitsubishi Kasei Corporation, Tokyo, Japan

[21] Appl. No.: 597,938

[22] Filed: Oct. 12, 1990

[30] Foreign Application Priority Data

Oct. 12, 1989 [JP] Japan .................................. 1-265721
Jul. 18, 1990 [JP] Japan .................................. 2-189667

[51] Int. Cl.$^5$ .............................................. C09D 11/00
[52] U.S. Cl. ........................................ 106/22; 106/20; 106/23
[58] Field of Search .................................... 106/23, 22

[56] References Cited

U.S. PATENT DOCUMENTS 4,841,037 6/1989 Ohta et al. ............................ 106/23

OTHER PUBLICATIONS

Ohta et al, Trisazo compound for inks; CA 107:124684y DE 3,619,573.

Primary Examiner—William R. Dixon, Jr.
Assistant Examiner—Margaret V. Einsmann
Attorney, Agent, or Firm—Sughrue, Mion, Zinn, Macpeak & Seas

[57] ABSTRACT

A recording liquid and an ink-jet recording method in which the recording liquid is used to record an image on a recording material comprising a substrate having provided thereon an ink-receiving layer containing a silicon-containing pigment and a binder resin by means of an ink-jet recording technique are disclosed, the recording liquid containing a solvent and at least one dye represented by formula (I):

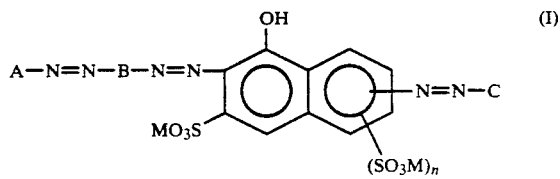

wherein A represents a substituted or unsubstituted phenyl, or naphthyl group; B represents a substituted or unsubstituted phenylene or naphthylene group; C represents an organic group as defined in the specification.

22 Claims, No Drawings

RECORDING LIQUID AND INK-JET RECORDING METHOD

FIELD OF THE INVENTION

The present invention relates to a recording liquid and an ink-jet recording method. More particularly, it relates to a recording liquid suited for use in ink-jet recording and also to an ink-jet recording method employing the same.

BACKGROUND OF THE INVENTION

So-called ink-jet recording has come to be used practically in which droplets of a recording liquid containing a water-soluble dye, such as a direct dye, an acid dye, etc., and a solvent are ejected through a minute nozzle orifice to construct images on a surface of a recording material.

Solvents that can be used in a recording liquid for ink-jet recording are severely restricted. That is, the solvents are required to give a durable recording liquid which can rapidly deposit to adhere to general-purpose recording papers for business and office use, such as paper for use in electrophotographic copiers and other PPCs (plain-paper copiers) and fanfold paper (continuous paper for use in computers etc. and to give high-quality printed characters, i.e., printed characters sharply outlined and non-blotting.

Dyes for use in a recording liquid for ink-jet recording, on the other hand, are required to have sufficient solubility in suitable solvents that are restricted in kind as described above, to be stable over a prolonged period of storage, and to give printed images having high densities and excellent water resistance, light resistance, and ozone resistance. However, it has been difficult for a dye to meet all these requirements simultaneously. In particular, since excellent light and ozone resistance has been attained with organic or inorganic pigments used as colorants in other printing techniques such as, for example, electrophotographic printing and thermal melting and transfer printing, there has been a strong desire for development of a recording liquid containing a dye having excellent light and ozone resistance comparable to that of the above organic or inorganic pigments. Although various proposals for the above purpose have been made in, for example, JP-A-55-144065, JP-A-57-30773, JP-A-57-207660, JP-A-58-147470, JP-A-62-190269, JP-A-62-190271, JP-A-62 190272, and JP-A-62-250082 (the term "JP-A" as used herein means an "unexamined published Japanese patent application"), these proposals are still insufficient in meeting the demand of the market.

SUMMARY OF THE INVENTION

Accordingly, an object of the present invention is to provide a recording liquid which, when applied by ink-jet recording, writing, or other recording techniques even to plain paper, gives high-quality prints with recorded images having a high density and excellent water resistance, light resistance, and ozone resistance, and which has excellent long-term storage stability.

Another object of the present invention is to provide an ink-jet recording method employing the above recording liquid.

These and other objects are accomplished with a recording liquid containing a solvent and at least one dye represented by formula (I) and with an ink-jet recording method which comprises recording an image by use of the recording liquid on a recording material comprising a substrate having provided thereon an ink-receiving layer containing a silicon-containing pigment and a binder resin by means of an ink-jet recording technique:

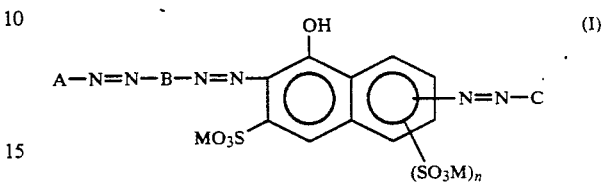

wherein A represents a substituted or unsubstituted phenyl, or naphthyl group; B represents a substituted or unsubstituted phenylene, or napthylene group; C represents an organic group selected from the group consisting of

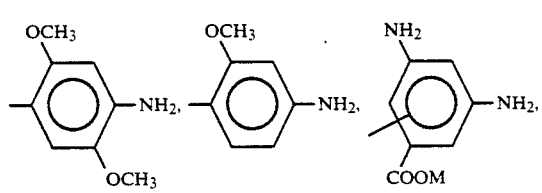

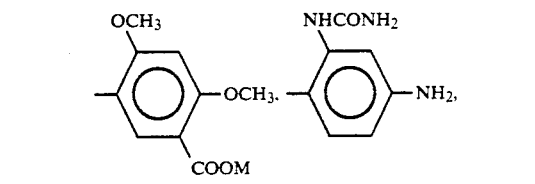

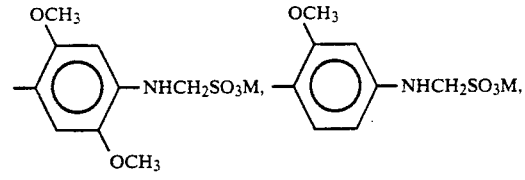

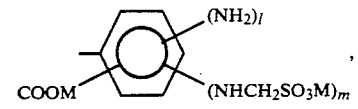

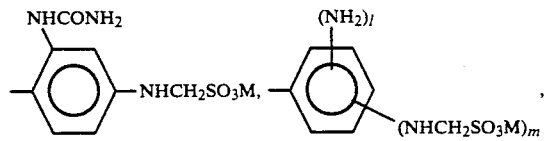

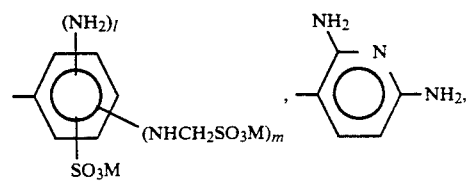

3

-continued

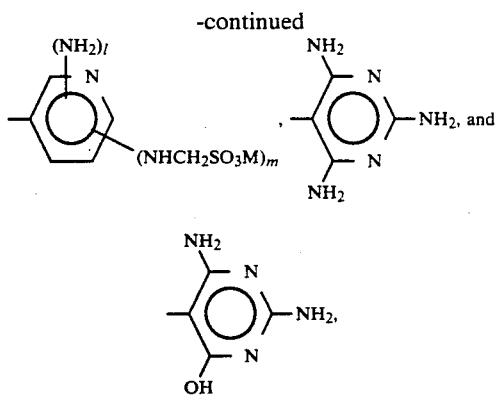

wherein l is a number of 0 or 1 and m is a number of 1 or 2, provided that l+m=2; M represents an alkali metal, ammonium group, or an organic amine salt; and n is a number of 0 or 1.

DETAILED DESCRIPTION OF THE INVENTION

The characteristic feature of the present invention resides in that a dye represented by the above-described formula (I) is used as a colorant for the recording liquid.

In formula (I), the phenyl or phenylene group represented by A or B is preferably substituted with one or more substituents selected from a $-SO_3M$ group amino group, a $C_{1-4}$-alkyl-carbonylamino group (i.e., having an alkyl moiety of 1 to 4 carbon atoms) such as acetylamino or propionylamino, a $C_{1-4}$ alkoxy group, hydroxyl group, a halogen atom, methyl group, and the naphthyl or naphthylene group represented by A or B is preferably substituted with an $-SO_3M$ group or a $C_{1-4}$-alkyl group. The phenyl, phenylene, naphthyl, or naphthylene group may have two or more such substituents.

Examples of the organic amine salt represented by M in formula (I) include a group formed by substituting three or the four hydrogen atoms in an ammonium group with a $C_{1-4}$-alkyl group and/or a $C_{1-4}$-hydroxyalkyl group.

Preferred examples of the group of A include the following groups:

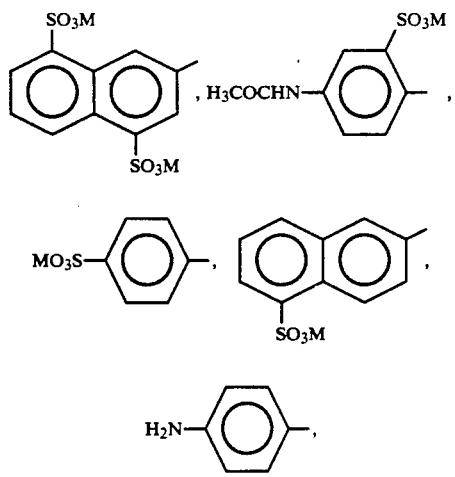

wherein M is as defined above and the first two groups are particularly preferred.

4

Preferred examples of the group of B include the following groups:

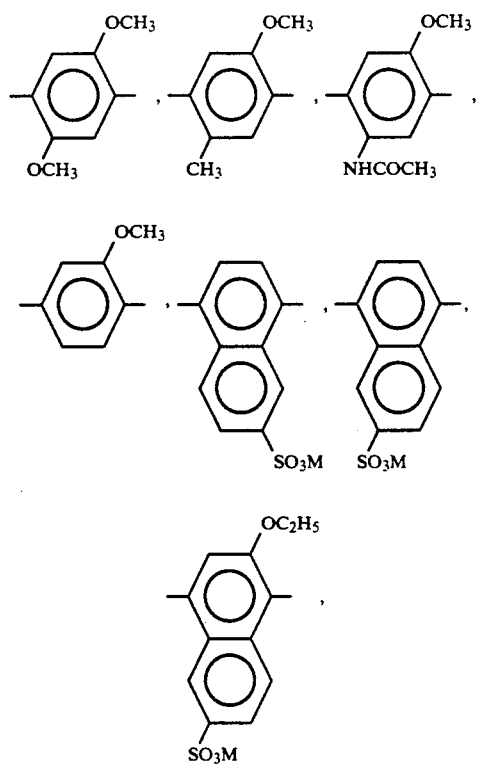

wherein M is as defined above. Of these, particularly preferred are the following groups:

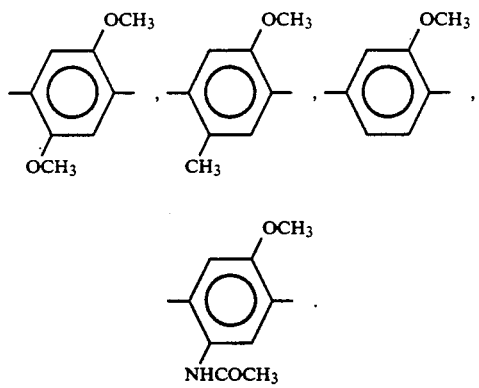

In formula (I) given above, C should be a group selected from the organic groups specified hereinabove, and preferred organic groups of these are as follows:

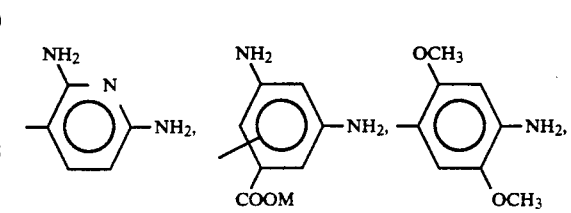

-continued

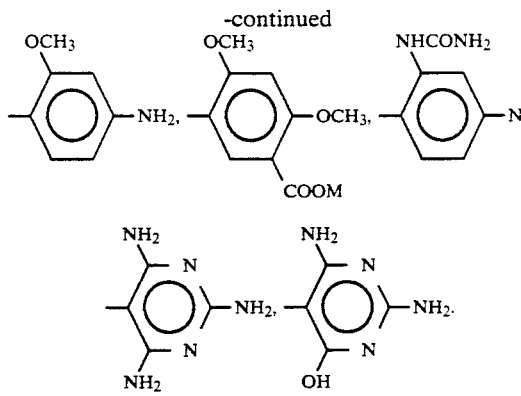

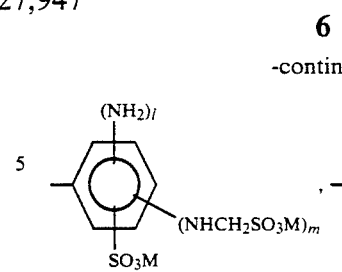

wherein l, m, and M are defined above. Of these, particularly preferred are:

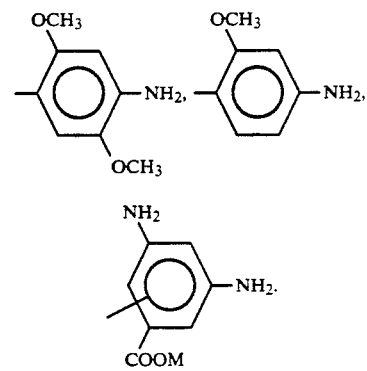

For the purpose of improving the solubility of the dye, the dye of formula (I) preferably has a group selected from the following organic groups for C:

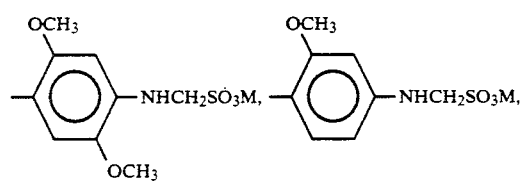

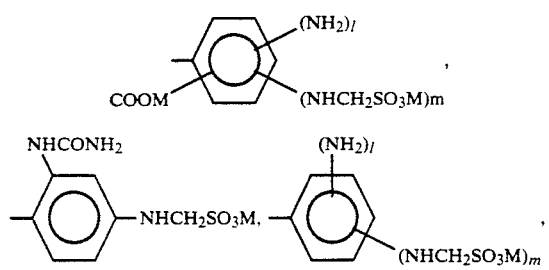

The dye employed in the recording liquid of the present invention should have the structure represented by formula (I) as described above, but it is preferred that all the substituents in formula (I) have their respective preferred structures.

Specific examples of the dye of formula (I) include the azo dyes of the following structural formulae (a) to (n).

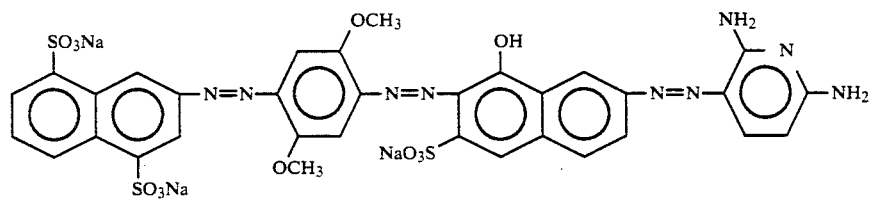
(a)

maximum absorption wavelength (in water) 600 nm

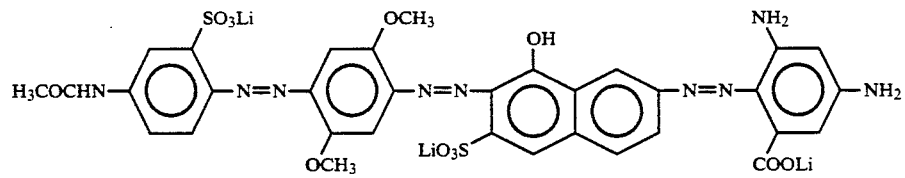
(b)

maximum absorption wavelength (in water) 606 nm

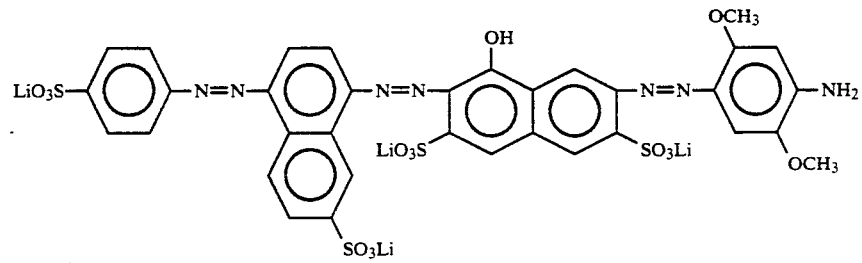
(c)

maximum absorption wavelength (in water)
598 nm
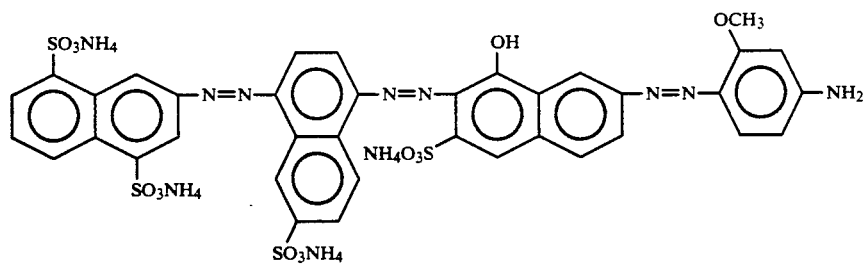
(d)
maximum absorption wavelength (in water)
600 nm
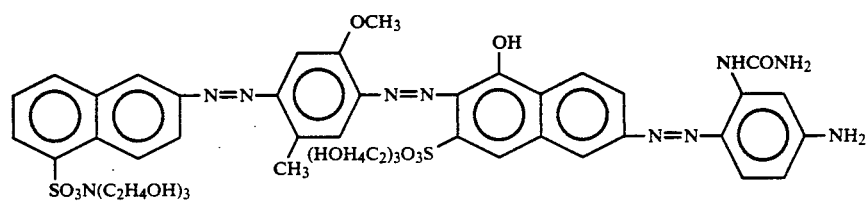
(e)
maximum absorption wavelength (in water)
602 nm
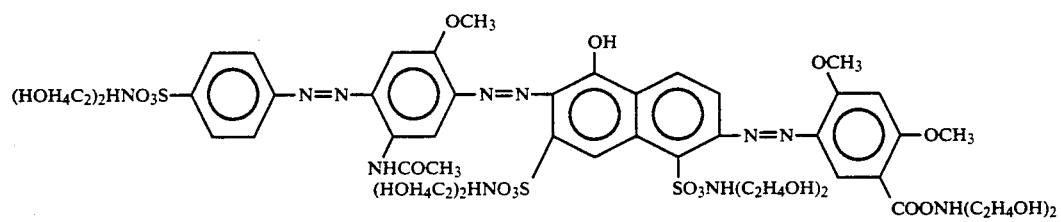
(f)
maximum absorption wavelength (in water)
593 nm
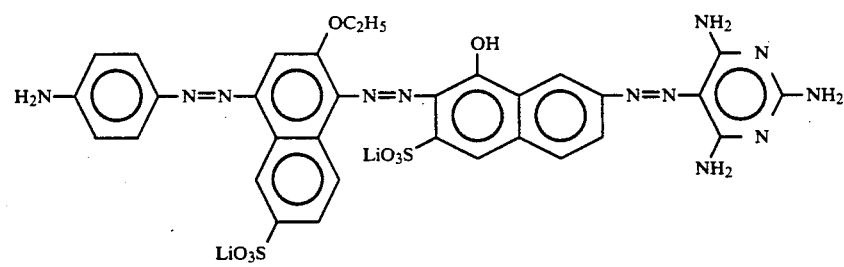
(g)
maximum absorption wavelength (in water)
610 nm
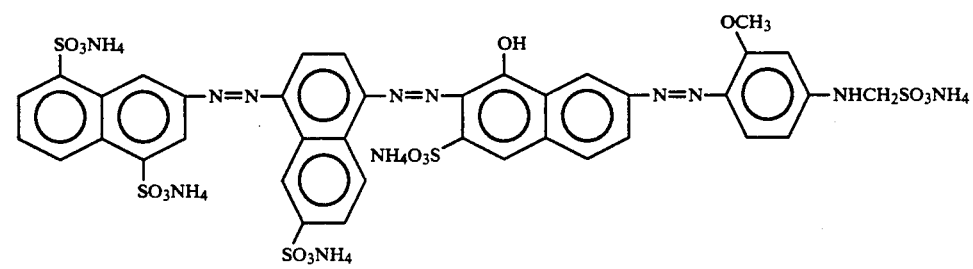
(h)
maximum absorption wavelength (in water)
600 nm

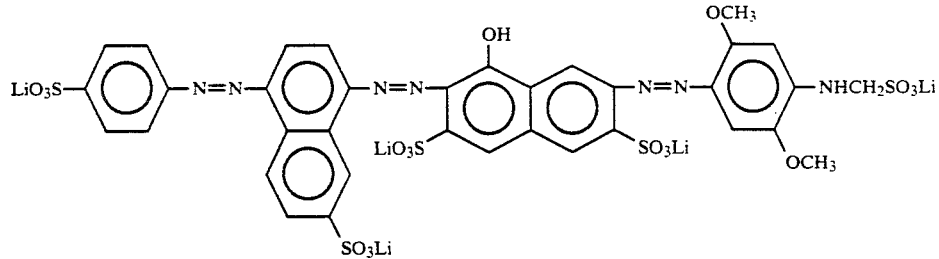

maximum absorption wavelength (in water)
598 nm

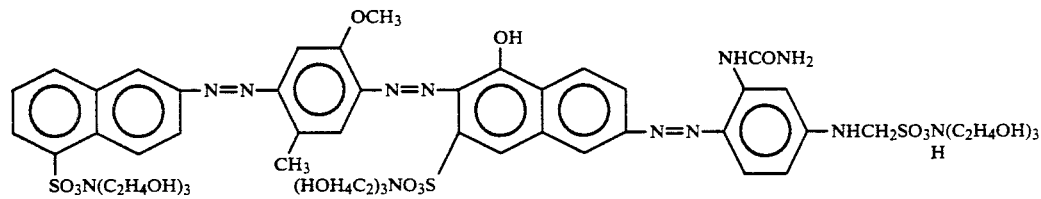

maximum absorption wavelength (in water)
602 nm

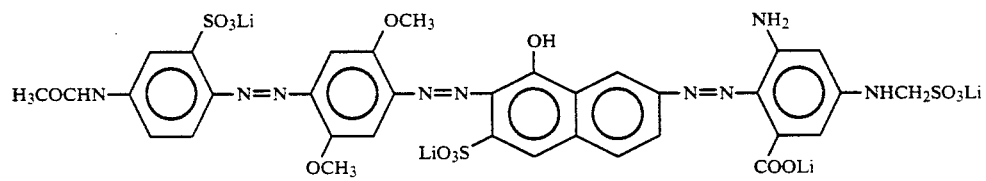

maximum absorption wavelength (in water)
606 nm

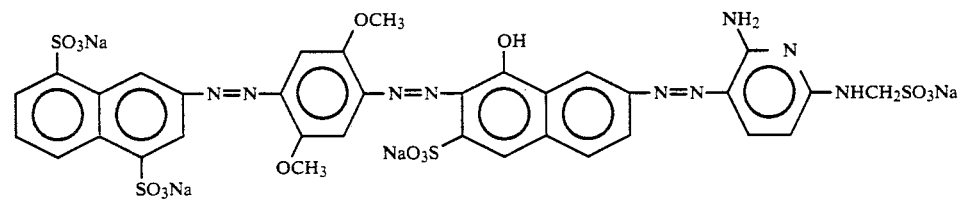

maximum absorption wavelength (in water)
606 nm

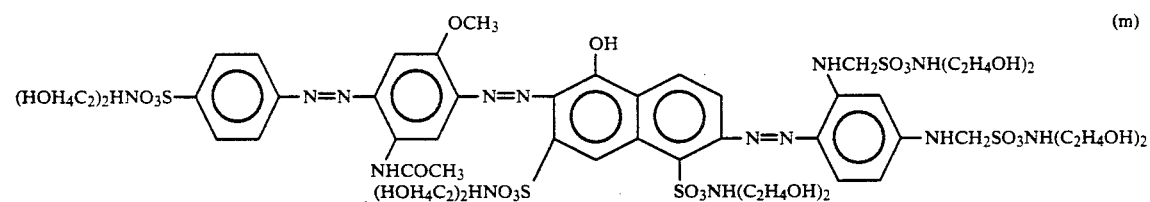

maximum absorption wavelength (in water)
593 nm

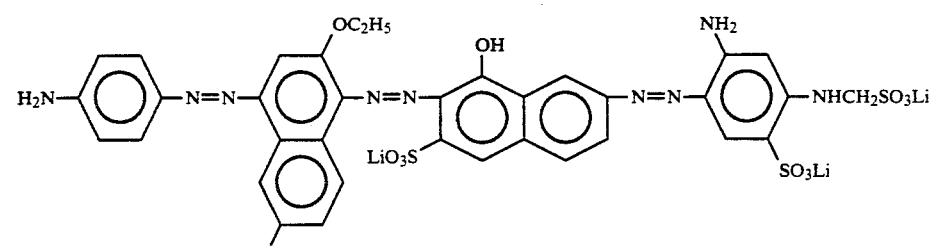

maximum absorption wavelength (in water)
610 nm

In addition to the above azo dyes, dyes represented by the following structural formulae (o) to (r) may advantageously be used.

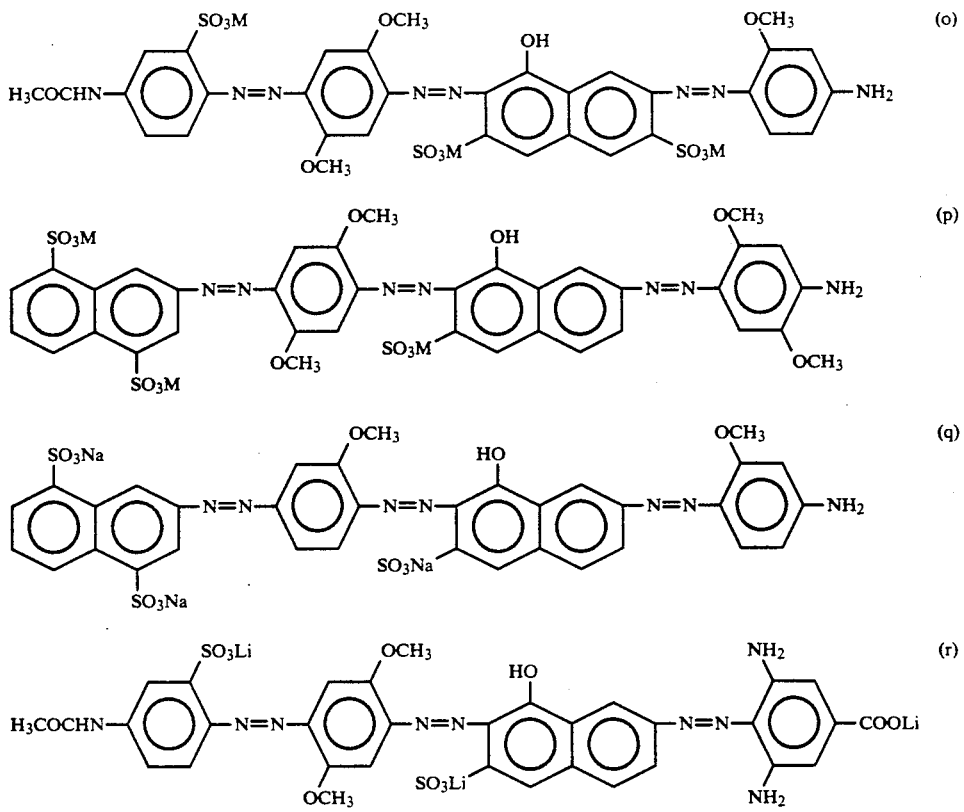

In the above formulae, M is as defined hereinbefore.

The azo dye shown by formula (I) can be produced by a known process involving diazotization and coupling reaction (see, for example, Shin Senryo Kagaku written by Yutaka Hosoda and published by Gihodo, Japan on Dec. 21, 1973, pp. 396–409), which is herein incorporated by reference.

Although a dye represented by formula (I) may be used singly in the recording liquid of this invention, such dyes of formula (I) may be used in combination of two or more thereof.

The content of the dye of formula (I) in the recording liquid is preferably from 0.5 to 8% by weight, more preferably from 2 to 5% by weight, based on the total amount of the recording liquid.

The solvent employed in the recording liquid of this invention preferably comprises a water-soluble organic solvent. Examples of the water-soluble organic solvent include ethylene glycol, propylene glycol, butylene glycol, diethylene glycol, triethylene glycol, poly(ethylene glycol) (polymerization degree: 200), poly(ethylene glycol) (polymerization degree: 400), glycerin, N-methylpyrrolidone, N-ethylpyrrolidone, 1,3-dimethylimidazolidinone, ethylene glycol monoallyl ether, ethylene glycol monobutyl ether, ethylene glycol monomethyl ether, diethylene glycol monomethyl ether, and the like. Of these, glycerin, ethylene glycol, ethylene glycol monoallyl ether and ethylene glycol monobutyl ether are preferred. The content of the water-soluble organic solvent in the recording liquid is generally from 10 to 50% by weight based on the total amount of the recording liquid. On the other hand, the content of water in the recording liquid is generally from 45 to 89.5% by weight based on the total amount of the recording liquid.

The recording liquid of the present invention can be further improved in quick-drying properties after printing and in print quality, by incorporating therein a compound selected from urea, thiourea, biuret, and semicarbazide in an amount of from 0.1 to 10% by weight, preferably from 0.5 to 5% by weight, based on the total amount of the recording liquid or by incorporating therein 0.001 to 5.0% by weight of a surfactant based on the total amount of the recording liquid.

The ink-jet recording method of the present invention is explained below in detail.

In the ink-jet recording method of this invention, an image is recorded by use of the above-described recording liquid on a recording material comprising a substrate having provided thereon an ink-receiving layer containing a silicon-containing pigment and a binder resin by means of an ink-jet recording technique.

The substrate employed in the recording material is not particularly limited, but paper or a plastic film may normally be employed as the substrate.

Examples of paper that can be used as the substrate include plain paper made up of cellulose and a loading material and synthetic papers made of a polyolefin, polystyrene, polyethylene terephthalate, etc.

Examples of plastic films that can be used as the substrate include films of polyvinyl chloride, polyethylene terephthalate, polyacrylates, polymethyl methacrylate, polystyrene, polyvinylidene fluoride, and the like.

The binder resin employed in a coating layer as the ink-receiving layer formed on the substrate is preferably a hydrophilic resin. Examples of hydrophilic resins that can be used as the binder resin include polyvinyl alcohol, starch, gelatin, carboxymethyl cellulose, hydroxyethyl cellulose, polyurethanes, polyvinylpyrrolidone, and the like. In combination with such a hydrophilic resin, polyvinyl acetate emulsion, an acrylic emulsion, a polyvinyl acetal, or the like may also be used for the purpose of improving the film strength of the coating layer.

Examples of the silicon-containing pigment employed in the ink-receiving layer of the recording material include silica, calcium silicate, aluminum silicate, and the like.

The ink-receiving layer may further contain such an inorganic pigment as light calcium carbonate, heavy calcium carbonate, talc, aluminum hydroxide, titanium dioxide, or the like, but it is preferred that the amount of such an inorganic pigment incorporated be not more than 50% by weight of the total amount of all the pigments incorporated.

The particle diameters of the silicon-containing pigment used are generally from 10 to 100 nm, preferably from 20 to 50 nm. Titanium dioxide that can be used has particle diameters of from 0.1 to 10 $\mu$m, preferably from 0.3 to 5 $\mu$m.

An aqueous coating fluid composed of the above-described ingredients is prepared and applied on the substrate described above. In the coating fluid, the proportion of all the pigments to the binder resin may be in the range of from 10/1 to ⅔ by weight. The coating fluid may have a total solid content of from 10 to 40% by weight.

In preparation of the coating fluid, water is mainly used as the solvent. However, the coating fluid may contain, besides water, a lower alcohol such as isopropyl alcohol or a lower alkyl ketone such as methyl ethyl ketone.

Additives such as a dispersant, an anti-foaming agent, a surfactant, a water resistance improver, or the like may be added to the aqueous coating fluid.

By coating the coating fluid on the substrate and drying the applied coating, a recording material having an ink-receiving layer is obtained. Examples of coating machines that can be used for this coating include a roll coater, blade coater, air knife coater, bar coater, slit reverse coater, die coater, and the like.

In general, the amount of the coating layer applied on the substrate is preferably from 5 to 50 g/m² (dry basis), because an applied amount less than 5 g/m² is apt to result in insufficient ink absorptivity, while an applied amount exceeding 50 g/m² is apt to result in insufficient color development on the ink-receiving layer surface.

As such a recording material, commercially available recording materials may be used such as ST-73A4 (trade name) manufactured by Sharp Co., Ltd., paper manufactured by Canon Co., Ltd. for BJ printers, and cut paper manufactured by Canon Co., Ltd. for Colour Bubble-Jet Copier 1.

Using the recording liquid of the present invention, recording of an image is conducted on the above-described recording material by means of an ink-jet recording technique.

There are various types of ink-jet recording techniques. For example, the techniques include continuous-jet printing (Sweet system, Hertz system), in which a stream of ink jet continuously ejected by pressurizing the ink at a constant pressure is deflected electrostatically thereby to conduct on-off operation, and on-demand printing in which ink droplets are ejected only on demand. Known as the latter ink-jet printing technique are the pulse-jet system in which ink is ejected by means of a piezoelectric element and the bubble-jet system in which ink is ejected from the nozzle by pressure caused by bubbles formed by heating.

Although the ink-jet recording technique employed in the method of the present invention is not limited to the above examples, it is convenient to employ an on-demand type printer.

These ink-jet recording techniques are described in detail, for example, in JP-A-54-51837 and JP-A-55-75465, which are herein incorporated by reference.

The present invention is explained in more detail by reference to the following Examples, which should not be construed to be limiting the scope of the invention. In the examples, all percents are by weight unless otherwise indicated.

EXAMPLE 1

Synthesis of the dye of formula (a) given above

Step 1

30.3 Grams (0.1 M) of 2-aminonaphthalene-4,8-disulfonic acid was dissolved with stirring in a mixture of 500 ml of water and 80 g of a 10% aqueous NaOH solution. To this solution was added 39.8 ml (0.45 M) of a 35% aqueous HCl solution, and the resulting solution was cooled to 0° to 5° C. To this solution was gradually added 7.25 g (0.105 M) of NaNO₂, and the resulting mixture was kept being stirred for 1 hour at a temperature of 0° to 5° C. Thereafter, the excess NaNO₂ was removed with sulfamic acid, thereby obtaining a diazo-compound solution.

Step 2

15.3 Grams (0.1 M) of 2,5-dimethoxyaniline was dissolved with stirring in a mixture of 300 ml of water and 8.8 ml (0.1 M) of a 35% aqueous HCl solution, and the resulting solution was cooled to 0° to 5° C. To this solution was added the diazo-compound solution obtained in Step 1 above. Subsequently, a 10% aqueous NaOH solution was added gradually to the resulting mixture for neutralization until the pH of the mixture became 2 to 3. This mixture was stirred for 3 hours at 0° to 5° C. to conduct coupling. The resulting reaction mixture was gradually neutralized with a 10% aqueous NaOH solution to finally adjust the pH of the mixture to 8.

Step 3

23.9 Grams (0.1 M) of 2-amino-8-naphthol-6-sulfonic acid was dissolved with stirring in a mixture of 500 ml of water and 40 g of a 10% aqueous NaOH solution. To this solution was added 30.9 ml (0.35 M) of a 35% aqueous HCl solution, and the resulting solution was cooled to 0° to 5° C. To this solution was gradually added 7.25 g (0.105 M) of NaNO₂, and the resulting mixture was stirred for 3 hours at 0° to 5° C. Thereafter, the excess NaNO₂ was removed with sulfamic acid, thereby obtaining a diazo-compound solution.

Step 4

In 300 ml of water was dissolved 10.9 g of 2,6-diaminopyridine. To this solution was gradually added with stirring a 10% aqueous HCl solution to adjust the pH of the solution to 6 to 7. This solution was cooled to 0° to 5° C. To the resulting solution was added the diazo-compound solution obtained in Step 3 above, and a 10% aqueous NaOH solution was then added gradually to the resulting mixture for neutralization until the pH of the mixture became 2 to 3. This mixture was stirred for 4 hours at 0° to 5° C to conduct coupling. The resulting reaction mixture was gradually neutralized with a 10% aqueous NaOH solution to finally adjust the pH of the mixture to 9.

Step 5

To the coupling reaction mixture obtained in Step 2 was added 39.8 ml (0.45 M) of a 35% aqueous HCl solution, and the resulting mixture was cooled to 0° to 5° C. To this mixture was gradually added 7.25 g (0.105 M) of NaNO$_2$, and the resulting mixture was stirred for 3 hours at 0° to 5° C. Thereafter, the excess NaNO$_2$ was removed with sulfamic acid, thereby obtaining a diazo-compound solution.

This diazo-compound solution was added to the coupling reaction mixture obtained in Step 4, while the pH of the resulting mixture was kept at 8 to 9 with a 10% aqueous NaOH solution. After completion of the coupling, NaCl was added to the resulting reaction mixture in an amount equal to 20% of the volume of the reaction mixture to effect salting-out. The resulting mixture was filtered to obtain a wet cake. The thus-obtained wet cake was dissolved in 1 liter of water at 60° C. After this solution was cooled to ordinary temperature, 2 liters of 2-propanol was added thereto to precipitate crystals, which were filtered off and then dried. Thus, 57.0 g of the desired dye was obtained in a yield of 63.0%.

Preparation and Evaluation of Recording Liquid and Evaluation of Recorded Image

| Ingredients for Recording Liquid | Amount (wt %) |
| --- | --- |
| Ethylene glycol monoallyl ether | 25 |
| Ethylene glycol | 22 |
| Dye of formula (a) given above | 3.5 |
| Water | 49.5 |

The above ingredients were mixed sufficiently to dissolve the dye. The resulting solution was filtered under pressure through a Teflon filter having a pore diameter of 1 μm, and then degassed with a vacuum pump and an ultrasonic cleaning machine, thereby preparing a recording liquid.

The thus-obtained recording liquid was subjected to ink-jet recording on an electrophotographic paper (manufactured by Fuji Xerox Co., Ltd.) using an ink-jet printer (HG-3000 manufactured by Epson Co.). The recording liquid and the resulting print were evaluated according to the following methods (1), (2), and (3), (1) Light resistance of recorded image Using a xenon fadeometer (manufactured by Suga Testing Machine Co.), the printed paper was irradiated with light for 100 hours. As a result, the recorded image suffered only little discoloration or fading.

(2) Water resistance of recorded image

The printed paper was immersed in water for 24 hours, and then the recorded image was examined for oozing. As a result, oozing of the recorded image was little and the density of the recorded image decreased only slightly.

(3) Storage stability of the recording liquid

The recording liquid was placed in sealed Teflon vessels. The vessels containing the recording liquid were kept for 1 month at 5° C. and 60° C., respectively, and then the recording liquid was examined for any change. As a result, no precipitate was observed in either case.

In addition to the above evaluations, ozone resistance was evaluated as follows.

(4) Ozone resistance of image printed on coated paper

Using the recording liquid and ink-jet printer described above, ink-jet recording was conducted on each of recording materials which were ST-73A4 (trade name, manufactured by Sharp Co., Ltd.) and cut paper (manufactured by Canon Co., Ltd.) for Color Bubble-Jet Copier 1, the latter having an ink-receiving layer containing polyvinyl alcohol and amorphous silica as major components.

The resulting prints were exposed for 90 minutes to air containing 12 ppm of ozone. Thereafter, the value of discoloration or fading ($\Delta E^*$) was determined in terms of color difference between before and after the exposure, in accordance with JIS Z8730. As a result, the value was as small as 6.

EXAMPLE 2

Synthesis of the dye of formula (b) given above

Step 1

To an aqueous solution of 2-amino-5-acetylaminobenzenesulfonic acid (0.1 M) was added 30.9 ml (0.35 M) of a 35% aqueous HCl solution, and the resulting solution was cooled to 0° to 5° C. To this solution was gradually added 7.25 g (0.105 M) of NaNO$_2$, and the resulting mixture was kept being stirred for 1 hour at a temperature of 0° to 5° C. Thereafter, the excess NaNO$_2$ was removed with sulfamic acid, thereby obtaining a diazo-compound solution.

Step 2

15.3 Grams (0.1 M) of 2,5-dimethoxyaniline was dissolved with stirring in a mixture of 300 ml of water and 8.8 ml (0.1 M) of a 35% aqueous HCl solution, and the resulting solution was cooled to 0° to 5° C. To this solution was added the diazo-compound solution obtained in Step 1 above. Subsequently, a 10% aqueous NaOH solution was added gradually to the resulting mixture for neutralization until the pH of the mixture became 2 to 3. This mixture was stirred for 5 hours at 0° to 5° C. to conduct coupling. The resulting reaction mixture was gradually neutralized with a 10% aqueous NaOH solution to finally adjust the pH of the mixture to 8.

Step 3

23.9 Grams (0.1 M) of 2-amino-8-naphthol-6-sulfonic acid was dissolved with stirring in a mixture of 500 ml of water and 40 g of a 10% aqueous NaOH solution. To this solution was added 30.9 ml (0.35 M) of a 35% aqueous HCl solution, and the resulting solution was cooled to 0° to 5° C. To this solution was gradually added 7.25 g (0.105 M) of NaNO$_2$, and the resulting mixture was stirred for 3 hours at 0° to 5° C. Thereafter, the excess NaNO$_2$ was removed with sulfamic acid, thereby obtaining a diazo-compound solution.

Step 4

In a mixture of 300 ml of water and 40 ml of a 10% aqueous NaOH solution was dissolved 15.2 g (0.1 M) of 3,5-diaminobenzoic acid. To this solution was added a 10% aqueous HCl solution to adjust the pH of the solution to 6 to 7. This solution was cooled to 0° to 5° C. To the resulting solution was added the diazo-compound solution obtained in Step 3 above, and a 10% aqueous NaOH solution was then added gradually to the resulting mixture for neutralization until the pH of the mixture became 2 to 3. This mixture was stirred for 5 hours at 0° to 5° C. to conduct coupling. After the 5-hour stirring, the resulting reaction mixture was gradually neutralized with a 10% aqueous NaOH solution to finally adjust the pH of the mixture to 9.

Step 5

To the coupling reaction mixture obtained in Step 2 was added 30.9 ml (0.35 M) of a 35% aqueous HCl solution, and the resulting mixture was cooled to 0° to 5° C. To this mixture was gradually added 7.25 g (0.105 M) of $NaNO_2$, and the resulting mixture was stirred for 3 hours at 0° to 5° C. Thereafter, the excess $NaNO_2$ was removed with sulfamic acid, thereby obtaining a diazo-compound solution.

This diazo-compound solution was added to the coupling reaction mixture obtained in Step 3, while the pH of the resulting mixture was kept at 8 to 9 with a 10% aqueous NaOH solution. After completion of the coupling, NaCl was added to the resulting reaction mixture in an amount equal to 20% of the volume of the reaction mixture to effect salting-out. The resulting mixture was filtered to obtain a wet cake. The thus-obtained wet cake was dissolved in 1 liter of water at 60° C. After this solution was cooled to ordinary temperature, 2 liters of 2-propanol was added thereto to precipitate crystals, which were filtered off and then dried.

Because the thus-obtained dye was in a sodium salt form, the following step was conducted to convert the dye into a lithium salt form.

Step 6

The dye obtained in Step 5 was dissolved in water. The resulting aqueous solution was treated with a strongly acidic cation exchange resin, and the eluate obtained was neutralized by adding LiOH. The resulting eluate was concentrated, filtered, and then dried, thereby obtaining 45.5 g of the desired dye. The yield was 55.2%.

Preparation and Evaluation of Recording Liquid and Evaluation of Recorded Image

| Ingredients for Recording Liquid | Amount (wt %) |
| --- | --- |
| Glycerin | 10 |
| Ethylene glycol | 10 |
| Dye of formula (b) given above | 5 |
| Water | 75 |

The above ingredients were treated in the same manner as in Example 1 to prepare a recording liquid. The recording liquid was subjected to evaluations (1) to (3) described in Example 1. As a result, good results were obtained in all these evaluations as in Example 1.

Further, ozone resistance, evaluation (4), was also examined in the same manner as in Example 1 and, as a result, the value of discoloration or fading ($\Delta E^*$) was 4.

The dyes used in the following Examples were prepared according to methods similar to those in Examples 1 and 2 given above.

EXAMPLE 3

| Ingredients for Recording Liquid | Amount (wt %) |
| --- | --- |
| Diethylene glycol monobutyl ether | 5 |
| Glycerin | 15 |
| Dye of formula (c) given above | 2 |
| Water | 78 |

The above ingredients were treated in the same manner as in Example 1 to prepare a recording liquid. This recording liquid was subjected to evaluations (1) to (3) described in Example 1. As a result, good results were obtained in all these evaluations as in Example 1.

Further, ozone resistance, evaluation (4), was also examined in the same manner as in Example 1 and, as a result, the value of discoloration or fading ($\Delta E^*$) was 10.

EXAMPLES 4 TO 7

Recording liquid was prepared in the same manner as in Example 1 except that the dyes of formulae (d) to (g) given hereinbefore were used respectively in place of the dye of formula (a). The thus-obtained recording liquid was subjected to evaluations (1) to (3) described in Example 1. As a result, good results were obtained in all these evaluations as in Example 1.

Further, the recording liquid was also evaluated with respect to the ozone resistance of images printed on coated paper (evaluation (4)). The results ($\Delta E^*$) obtained are as follows.

| Example No. | Dye No. | Ozone Resistance ($\Delta E^*$) |
| --- | --- | --- |
| 4 | d | 11 |
| 5 | e | 7 |
| 6 | f | 6 |
| 7 | g | 9 |

EXAMPLE 8

| Ingredients for Recording Liquid | Amount (wt %) |
| --- | --- |
| Ethylene glycol monoallyl ether | 25 |
| Ethylene glycol | 22 |
| Dye of formula (h) given above | 3.5 |
| Water | 49.5 |

The above ingredients were treated in the same manner as in Example 1 to prepare a recording liquid. This recording liquid was subjected to evaluations (1) to (3) described in Example 1. As a result, good results were obtained in all these evaluations as in Example 1.

Further, ozone resistance, evaluation (4), was also examined in the same manner as in Example 1 and, as a result, the value of discoloration or fading ($\Delta E^*$) was 5.

EXAMPLE 9

| Ingredients for Recording Liquid | Amount (wt %) |
| --- | --- |
| Glycerin | 10 |
| Ethylene glycol | 10 |
| Dye of formula (i) given above | 5 |
| Water | 75 |

The above ingredients were treated in the same manner as in Example 1 to prepare a recording liquid. This recording liquid was subjected to evaluations (1) to (3) described in Example 1. As a result, good results were obtained in all these evaluations as in Example 1. Further, ozone resistance, evaluation (4), was also examined in the same manner as in Example 1 and, as a result, the value of discoloration or fading (ΔE*) was 9.

EXAMPLE 10

| Ingredients for Recording Liquid | Amount (wt %) |
| --- | --- |
| Ethylene glycol monobutyl ether | 5 |
| Glycerin | 15 |
| Dye of formula (j) given above | 2 |
| Water | 78 |

The above ingredients were treated in the same manner as in Example 1 to prepare a recording liquid. This recording liquid was subjected to evaluations (1) to (3) described in Example 1. As a result, good results were obtained in all these evaluations as in Example 1.

Further, ozone resistance, evaluation (4), was also examined in the same manner as in Example 1 and, as a result, the value of discoloration or fading (ΔE*) was 6.

-continued

| Example No. | Dye No. | Ozone Resistance (ΔE*) |
| --- | --- | --- |
| 13 | m | 7 |
| 14 | n | 11 |

EXAMPLES 15 AND 16

Recording liquid was prepared in the same manner as in Example 1 except that the dyes of formulae (o) and (p) wherein M is Na were used, respectively, in place of the dye of formula (a). The thus-obtained recording liquid was subjected to ozone resistance evaluation (4) described in Example 1. As a result, the value of (ΔE*) for the recording liquid employing the dye of formula (o) was 5, while that for the recording liquid employing the dye of formula (p) was 7.

COMPARATIVE EXAMPLES 1 TO 3

Recording liquid was prepared in the same manner as in Example 1 except that the dyes of the structural formulae shown below were used, respectively, in place of the dye of formula (a). The thus-obtained recording liquid examined for the ozone resistance (ΔE*) of recorded images according to the evaluation method (4) described in Example 1. The results obtained are as follows.

| Structural formula | Ozone resistance (ΔE*) | Remarks |
| --- | --- | --- |
| H₃COCHN—◯—N=N—◯—N=N—[naphthalene-OH, NaO₃S, NaO₃S]—N=N—◯(NH₂)—NH₂, SO₂Na | 20 | The dye used in Example 1 of JP-A-55-152747. |
| H₂N—◯(NH₂)—N=N—◯—N=N—[naphthalene-HO, SO₃Na]—N=N—◯(NH₂)—NH₂ | 18 | The dye used in Example 5 of JP-A-55-144067. |
| [naphthalene-SO₃Na, SO₃Na]—N=N—◯(OCH₃, OCH₃)—N=N—[naphthalene-HO, SO₃Na]—N=N—◯(NH₂)—NH₂, SO₃Na | 17 | The dye used in Example 1 of JP-A-61-285276. |

EXAMPLES 11 TO 14

Recording liquid was prepared in the same manner as in Example 1 except that the dyes of formulae (k) to (n) given hereinbefore were used, respectively, in place of the dye of formula (a). The thus-obtained recording liquid was subjected to evaluations (1) to (3) described in Example 1. As a result, good results were obtained in all these evaluations as in Example 1.

Further, the recording liquid was also evaluated with respect to ozone resistance, evaluation (4). As a result, the value of discoloration or fading (ΔE*) for each Example is as follows.

| Example No. | Dye No. | Ozone Resistance (ΔE*) |
| --- | --- | --- |
| 11 | k | 6 |
| 12 | l | 5 |

While the invention has been described in detail and with reference to specific embodiments thereof, it will be apparent to one skilled in the art that various changes and modifications can be made therein without departing from the spirit and scope thereof.

What is claimed is:

1. A recording liquid containing a solvent and at least one dye represented by formula (I):

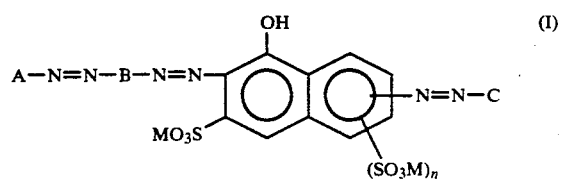

wherein A represents a substituted or unsubstituted phenyl, or naphthyl group; B represents a substituted or unsubstituted phenylene or naphthylene group; C represents an organic group selected from the group consisting of

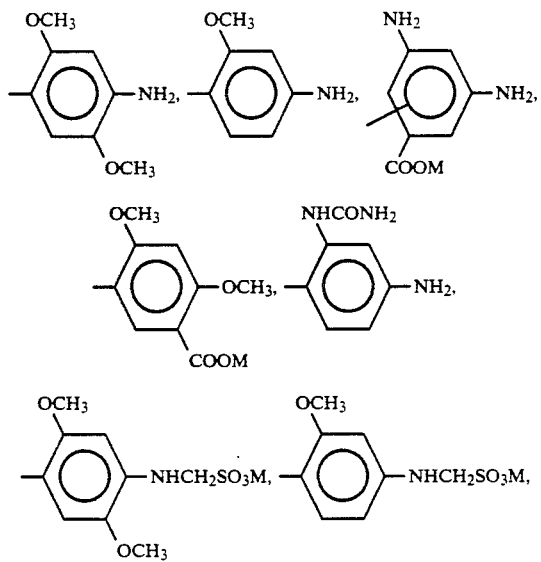

wherein l is a number of 0 or 1 and m is a number of 1 or 2, provided that l+m=2; M represents an alkali metal, ammonium group, or an organic amine salt; and n is a number of 0 or 1.

2. A recording liquid as claimed in claim 1, wherein said C in formula (I) is an organic group selected from the group consisting of

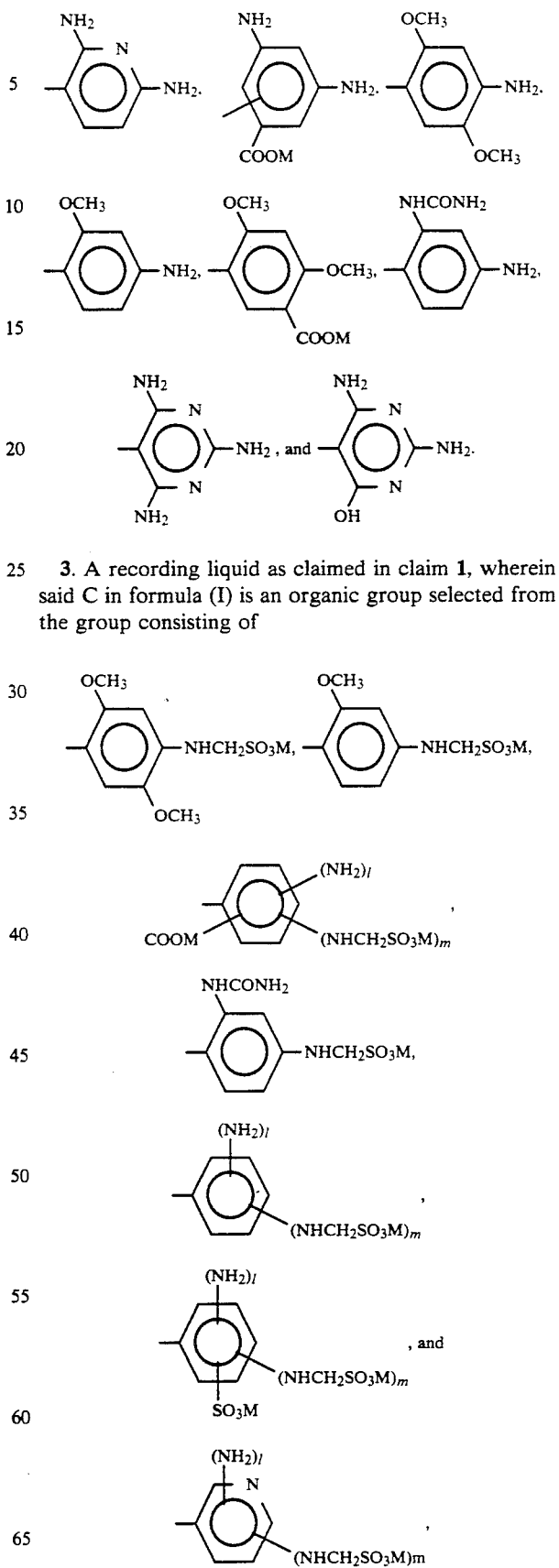

3. A recording liquid as claimed in claim 1, wherein said C in formula (I) is an organic group selected from the group consisting of wherein l, m, and M are as defined in claim 1.

4. A recording liquid as claimed in claim 1, wherein said C in formula (I) is

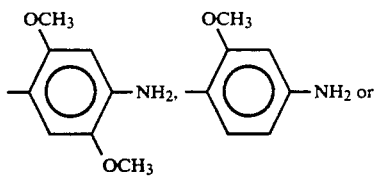

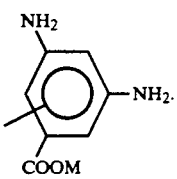

5. A recording liquid as claimed in claim 1, wherein the substituent of said phenyl or phenylene group represented by A or B in formula (I) is a -SO$_3$M group, amino group, a C$_{1-4}$-alkyl-carbonylamino group, a C$_{1-4}$-alkoxy group, hydroxyl group, a halogen atom, or methyl group; and that of said naphthyl or naphthylene group represented by A or B in formula (I) is a -SO$_3$M group or a C$_{1-4}$-alkyl group.

6. A recording liquid as claimed in claim 1, wherein said B in formula (I) is a group selected from the group consisting of

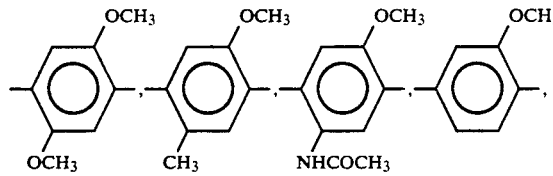

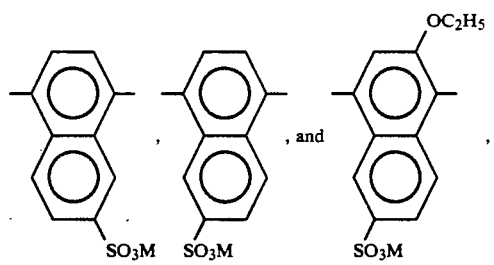

wherein M represents an alkali metal, ammonium group, or an organic amine salt.

7. A recording liquid as claimed in claim 6, wherein said B in formula (I) is a group selected from the group consisting of

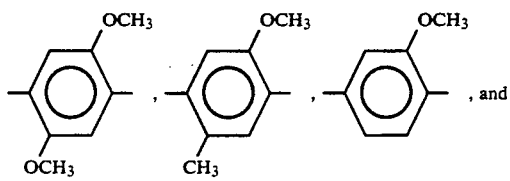

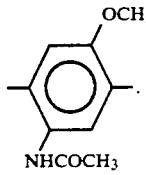

8. A recording liquid as claimed in claim 1, wherein said B in formula (I) is a group selected from the group consisting of

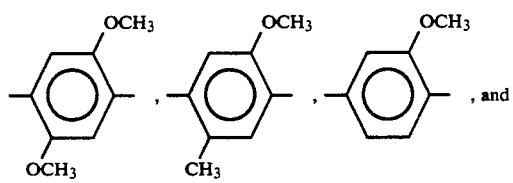

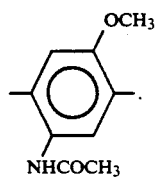

and said C in formula (I) is a group selected from the group consisting of

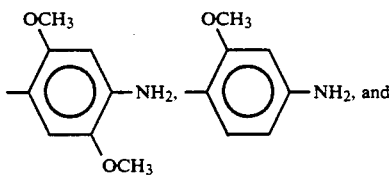

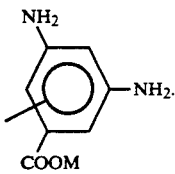

9. A recording liquid as claimed in claim 1, wherein the content of said dye represented by formula (I) is from 0.5 to 8% by weight based on the total amount of the recording liquid.

10. A recording liquid as claimed in claim 9, wherein the content of said dye represented by formula (I) is from 2 to 5% by weight based on the total amount of the recording liquid.

11. A recording liquid as claimed in claim 1, wherein said solvent is a mixed solvent composed of water and a water-soluble organic solvent.

12. A recording liquid as claimed in claim 11, wherein said water-soluble organic solvent is at least one member selected from the group consisting of ethylene glycol, propylene glycol, butylene glycol, diethylene glycol, triethylene glycol, poly(ethylene glycol) having a polymerization degree of 200, poly(ethylene glycol) having a polymerization degree of 400, glycerin, N-methylprrolidone, N-ethylpyrrolidone, 1,3-dimethylimidazolidinone, ethylene glycol monoallyl ether, ethylene glycol monobutyl ether, ethylene glycol monomethyl ether, and diethylene glycol monomethyl ether.

13. A recording liquid as claimed in claim 11, wherein the content of said water-soluble organic solvent is from 10 to 50% by weight based on the total amount of the recording liquid.

14. A recording liquid as claimed in claim 11, wherein the content of said water is from 45 to 89.5% by weight based on the total amount of the recording liquid.

15. A recording liquid as claimed in claim 1, which further contains a compound selected from the group consisting of urea, thiourea, biuret, and semicarbazide.

16. A recording liquid as claimed in claim 15, wherein the content of said compound is from 0.1 to 10% by weight based on the total amount of the recording liquid.

17. A recording liquid as claimed in claim 1, which further contains a surfactant in an amount of 0.001 to 5.0% by weight based on the total amount of the recording liquid.

18. A recording liquid as claimed in claim 1, wherein said A is

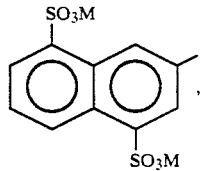

said B is

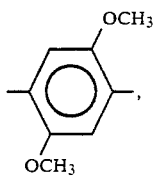

and said C is

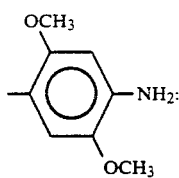

,
wherein M represents an alkali metal, ammonium group, or an organic amine salt.

19. A recording liquid as claimed in claim 1, wherein said A is

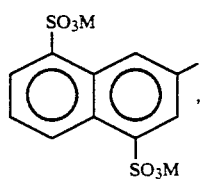

said B is

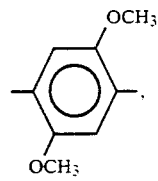

and said C is

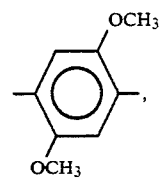

,
wherein M represents an alkali metal, ammonium group, or an organic amine salt.

20. A recording liquid as claimed in claim 1, wherein said A is

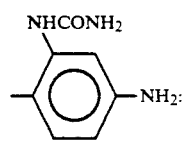

,
said B is

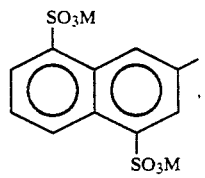

,
and said C is

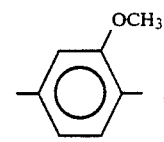

wherein M represents an alkali metal, ammonium group, or an organic amine salt.

21. A recording liquid as claimed in claim 1, wherein said A is

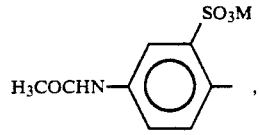

,
said B is

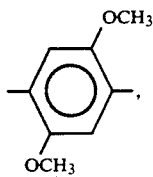
, and said C is
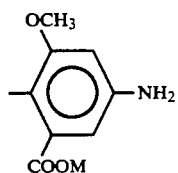
, or
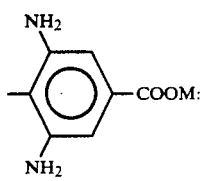
wherein M represents an alkali metal, ammonium group, or an organic amine salt.
22. A recording liquid as claimed in claim 1, wherein said A is
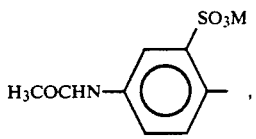
, said B is
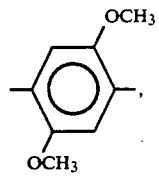
, and said C is
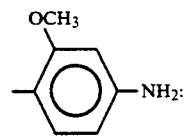
, wherein M represents an alkali metal, ammonium group, or an organic amine salt.
* * * * *